(12) United States Patent
Yau et al.

(10) Patent No.: US 8,185,653 B2
(45) Date of Patent: May 22, 2012

(54) METHOD AND APPARATUS FOR AD HOC MESH ROUTING

(76) Inventors: Johnny Yau, Jersey City, NJ (US); Christopher J. Ngan, Jersey City, NJ (US)

( * ) Notice: Subject to any disclaimer, the term of this patent is extended or adjusted under 35 U.S.C. 154(b) by 675 days.

(21) Appl. No.: 11/572,439

(22) PCT Filed: Aug. 9, 2005

(86) PCT No.: PCT/US2005/028304
§ 371 (c)(1),
(2), (4) Date: Jan. 22, 2007

(87) PCT Pub. No.: WO2006/020658
PCT Pub. Date: Feb. 23, 2006

(65) Prior Publication Data
US 2008/0002599 A1    Jan. 3, 2008

Related U.S. Application Data

(60) Provisional application No. 60/599,938, filed on Aug. 9, 2004.

(51) Int. Cl.
*G06F 15/173* (2006.01)
(52) U.S. Cl. ........ 709/238; 709/202; 709/228; 709/242; 714/748
(58) Field of Classification Search .......... 709/202–203, 709/227–230, 238–242; 714/746–750
See application file for complete search history.

(56) References Cited

U.S. PATENT DOCUMENTS

| | | | |
|---|---|---|---|
| 4,644,532 A | 2/1987 | George et al. | |
| 4,661,947 A | 4/1987 | Lea et al. | |
| 4,956,835 A | 9/1990 | Grover | |
| 5,007,052 A | 4/1991 | Flammer | |
| 5,056,085 A | 10/1991 | Vu | |
| 5,101,407 A * | 3/1992 | Harvey et al. | 370/347 |
| 5,115,433 A | 5/1992 | Baran et al. | |
| 5,138,615 A | 8/1992 | Lamport et al. | |
| 5,479,408 A * | 12/1995 | Will | 370/313 |
| 5,488,608 A | 1/1996 | Flammer, III | |
| 5,506,838 A | 4/1996 | Flanagan | |
| 5,550,805 A | 8/1996 | Takatori et al. | |

(Continued)

OTHER PUBLICATIONS

Poor; "Wireless Mesh Networks;" Sensors Online; Feb. 2003.

(Continued)

*Primary Examiner* — Bharat N Barot
(74) *Attorney, Agent, or Firm* — Wong, Cabello, Lutsch, Rutherford & Brucculeri, L.L.P.

(57) ABSTRACT

Packets are routed in a wireless mesh network by assigning a probability of packet retransmission based on certain factors which may include the number of hops the packet has made, whether the destination is within a certain number of known hops of the receiving node, the number of nearby nodes, whether the receiving node is a member of a past known route to the destination and/or whether a nearby neighbor of the receiving node is a member of a past known route to the destination. Once a probability is assigned, a random number generator may be used to make a decision between retransmitting the packet and dropping the packet. Signal quality may also be used as a factor in the probability of retransmission. In a preferred embodiment, Bloom filters are used to store information in the header of a data packet containing the identifiers of forwarding nodes and the identifiers of nodes on a previously-successful route from the source to the destination.

34 Claims, 4 Drawing Sheets

U.S. PATENT DOCUMENTS

| | | | |
|---|---|---|---|
| 5,589,136 A | 12/1996 | Northrup et al. | |
| 5,594,948 A * | 1/1997 | Talarmo et al. | 455/518 |
| 5,812,524 A | 9/1998 | Moran et al. | |
| 5,835,482 A | 11/1998 | Allen | |
| 5,844,888 A | 12/1998 | Markkula, Jr. et al. | |
| 5,926,101 A | 7/1999 | Dasgupta | |
| 5,987,011 A | 11/1999 | Toh | |
| 6,091,724 A | 7/2000 | Chandra et al. | |
| 6,111,872 A * | 8/2000 | Suematsu et al. | 370/350 |
| 6,122,282 A | 9/2000 | Chng | |
| 6,130,881 A | 10/2000 | Stiller et al. | |
| 6,275,492 B1 | 8/2001 | Zhang | |
| 6,301,257 B1 | 10/2001 | Johnson et al. | |
| 6,301,261 B1 | 10/2001 | Nakatsugawa et al. | |
| 6,324,162 B1 | 11/2001 | Chaudhuri | |
| 6,329,902 B1 | 12/2001 | Lee et al. | |
| 6,363,425 B1 * | 3/2002 | Hook et al. | 714/748 |
| 6,377,543 B1 | 4/2002 | Grover et al. | |
| 6,414,955 B1 | 7/2002 | Clare et al. | |
| 6,453,360 B1 * | 9/2002 | Muller et al. | 709/238 |
| 6,483,808 B1 | 11/2002 | Rochberger et al. | |
| 6,640,087 B2 | 10/2003 | Reed et al. | |
| 6,646,989 B1 | 11/2003 | Khotimsky et al. | |
| 6,704,301 B2 | 3/2004 | Chari et al. | |
| 6,845,091 B2 | 1/2005 | Ogier et al. | |
| 6,901,593 B2 * | 5/2005 | Aweya et al. | 709/228 |
| 6,920,477 B2 * | 7/2005 | Mitzenmacher | 709/203 |
| 7,254,609 B2 * | 8/2007 | Hart et al. | 709/203 |
| 7,554,998 B2 * | 6/2009 | Simonsson et al. | 370/406 |
| 7,975,008 B2 * | 7/2011 | Hart et al. | 709/228 |
| 2003/0142623 A1 * | 7/2003 | Bernhard et al. | 370/229 |
| 2005/0030921 A1 * | 2/2005 | Yau | 370/329 |

OTHER PUBLICATIONS

Ogier et al.; "Topology Dissemination Based on Reverse-Path Forwarding (TBRPF);" The Internet Society; Feb. 2004.

FireTide; "An Introduction to Wireless Mesh Networking;" White Paper; FireTide Wireless Instant Networks; Apr. 2004.

Johnson et al.; "DSR: the Dynamic source routing Protocol for Multi-Hop Wireless Ad Hoc Networks;" edited by Charles E. Perkins, Chapter 5; pp. 139-172; Addison-Wesley, 2001.

Perkins et al.; "Ad-hoc On-Demand Distance Vector Routing;" Proceedings of the 2nd IEEE Workshop on Mobile Computing Systems and Applications; New Orleans, LA; Feb. 1999; pp. 90-100.

* cited by examiner

METHOD AND APPARATUS FOR AD HOC MESH ROUTING

CROSS-REFERENCE TO RELATED APPLICATION

This application claims the priority of U.S. Provisional Patent Application Ser. No. 60/599,938 filed Aug. 9, 2004, the disclosure of which is hereby incorporated in its entirety by reference.

BACKGROUND OF THE INVENTION

1. Field of the Invention

This invention relates to packet radio communication systems. More specifically, it relates to a method for routing packets with increased efficacy in an ad-hoc wireless mesh communications network.

2. Description of the Related Art

A mesh network is a network that employs one of two connection arrangements, full mesh topology or partial mesh topology. In the full mesh topology, each node is connected directly to each of the others. In the partial mesh topology, nodes are connected to only some, not all, of the other nodes. Nothing is necessarily dynamic in a mesh. However, in recent years, and in connection with wireless networks, the term "mesh" is often used as a synonym for "ad hoc" or "mobile" network. Obviously, combining the two characteristics of a mesh topology and ad hoc capabilities is an attractive proposition.

As used herein, a wireless mesh network assumes a network that handles many-to-many connections and is capable of dynamically updating and optimizing these connections. This may be (but does not have to be) a mobile network in which it is assumed that each (or at least some) of the nodes of the network are mobile units that change position over time. The dynamic management of complex routing information, which likely includes information about external networks (e.g. the Internet and gateways to it), is arguably the biggest challenge for (dynamic) mesh protocols.

Mesh Networking is particularly suited to wireless networks, where the connections can't be predicted in the same way as a wired network. Wireless mesh networking is mesh networking implemented over a wireless packet radio. It caters to mobile nodes, instant network growth and unpredictable variations in reception and coverage.

Mesh networking builds up a wide-spread, multi-hop network with each node joining neighboring nodes already in the network on demand. Once joined the nodes can explore the network and establish their routes through it, finding the resources that they need automatically.

Networking infrastructure is therefore decentralized and inexpensive, as each node need only transmit as far as an adjacent node rather than a centralized base station. Nodes act as repeaters to transmit data from nearby nodes to peers that are too far away to reach, resulting in a network that can span a large distance, especially over rough or difficult terrain. Mesh networks are also extremely reliable, as each node is connected to several other nodes. If one node drops out of the network, due to hardware failure or any other reason, its neighbors simply find another route. Extra capacity as permitted by radio spectrum usage can be installed by simply adding more nodes. Mesh networks may involve either fixed or mobile devices.

In packet-routed networks data is broken up into packets having a certain maximum size. A data packet is provided with a header containing information about the packet. This information may include the source of the packet, the intended destination of the packet and where the data in that particular packet fits into the data stream. A data packet hops from one device to another until it reaches a given destination. Dynamic routing capabilities included in each device allow this to happen. Each device must determine what to do with the data it receives—pass it on to the next device, keep it or delete it.

In a wireless network, packets may be transmitted by a radio transmitter and received by a radio receiver (together, a "transceiver"). Most often, such transmissions are omni-directional—i.e., the transmitter broadcasts the signal in all directions and any receiver within range receives it. Upon receiving a data packet, one of the first things a receiver may do is examine the packet's header to determine whether it (the receiving node) is the intended recipient—i.e., whether it is the specified destination of the packet. If so, the packet may be placed into a queue for subsequent re-assembly of the data stream. However, if it is not the intended destination, the receiver must decide what to do with the packet. One simple strategy is simply to ignore it—i.e., "drop" the packet. This strategy limits data transmission to nodes that are directly within the range of a transmitting node.

Another simple strategy is to have the receiving node retransmit the packet if it is not the intended destination and it has not previously retransmitted the packet. This has the equivalent effect of boosting the signal as it travels through nodes acting as repeaters, but the network can quickly become overloaded since it is a naïve, blind retransmission and there is no strategy to limit the life of packets and no "direction" to their travel through the network. Accordingly, a number of more sophisticated algorithms have been developed to address these issues.

In current networks, routing of data is done in a deterministic manner so that information that no longer reflects the topology of the network due to the failure of a part of a network usually negatively impacts the performance of the entire network. Most networks have a large number of stable connections and nodes. In such networks, deterministic algorithms can be used to effectively route data from any point in a network to any other point in the same network. Deterministic algorithms have a certain level of overhead that is only tolerable in stable networks given the performance of the algorithm after such overhead is paid—each node must have knowledge of the topology of the network. However, an increasing number of networks are now appearing where there exists such a low level of connection stability and node availability that the overhead associated with deterministic algorithms, that was acceptable in stable networks, effectively becomes a cost that dominates any benefit afforded by the algorithm. Examples of such less stable networks that Ad-Hoc Mesh Routing ("AHMR") can be used to address are ad-hoc wireless networks.

Algorithms of the prior art which attempt to form a temporarily stable structure to ad-hoc networks without the use of any existing network infrastructure or centralized components include Ad-hoc On-Demand Distance Vector Routing (AODV), Destination-Sequenced Distance Vector protocol (DSDV), Temporally-Ordered Routing Algorithm (TORA), Associativity Based Routing (ABR) and Dynamic Source Routing (DSR). The AODV and DSDV algorithms are discussed in detail, below.

Most ad-hoc routing algorithms can be divided into one of two categories—table driven algorithms, and source-initiated on-demand driven algorithms. Table driven algorithms are characterized by an attempt to maintain network-wide, consistent, and up-to-date information about the network and the routes from one node to any other node in the network. These algorithms are often associated with a constant propagation of routing information that is routine or triggered by topology changes. This information must be propagated to all nodes, which results in the algorithm incurring substantial amounts of overhead and network traffic. However, because a consistent view is constantly being updated on every node, there is little latency associated with sending initial packets, and routes are always defined. The result of constantly maintaining views of the network topology is accuracy which is a function of the size of the network. However, these algorithms do not scale well, and the level of network overhead increases drastically with the size of the network. Thus, these algorithms have poor scalability characteristics.

Source-initiated on-demand driven algorithms build routes on demand, and when a source node requests. There is no need to maintain a consistent view of global network state on each component node, and as such, there is substantially less overhead necessary. However, there is a cost associated with the first query when a route to a specific destination is requested. Furthermore, this cost is incurred on every query to establish a route, which often occurs in association with a broken route. However, the substantially lower level of network overhead resulting from not having to keep a consistent view of the entire network topology on every node allows this class of algorithms to scale better than Table-Driven algorithms. However, these algorithms scale in proportion to the average length of routes, and as this increases, overhead quickly increases.

Another class of algorithms, in which the method of the present invention exists, are algorithms in which there are few constraints on data propagation and no need for any global state to be maintained. There is no concept of an explicit route as seen in the source-initiated on-demand algorithms, nor is there a need to maintain an accurate and global view of the network state on each individual nodes. Data is allowed to freely flow through the network, and data is directed on a network level reflecting the aggregate behavior of the network.

Ad-hoc On-Demand Distance Vector Routing (AODV)

Ad-hoc On-Demand Distance Vector Routing (hereafter referred to as "AODV") is a routing algorithm designed for ad-hoc topologically unstable networks that is based on building specific routes between a node and its destination only when requested, or "on-demand". The routes are then maintained on an "as needed" basis where routes are eliminated upon a timeout based on data traffic or when it is discovered that an intermediate node along the node breaks the chained route. In building routes, AODV also supports the creation of multicast trees in which members are connected by routes.

AODV uses a chained, cyclical sequence of route/request queries in order to first conduct route discovery, and then to inform nodes back along the route of their membership in the specific route. In order to find a route, the source node broadcasts a route request query packet (RREQ). Nodes that receive the RREQ packet then take note of the node sending the RREQ packet to set up a reverse route to that node corresponding to the requested route, and then forwards the RREQ packet onward if it is either not the destination nor does it have the requested route in it's route table. This process continues until the destination or route-to-destination is reached. At this point, a route reply packet (RREP) is returned along the back-pointers constructed during the propagation of the RREQ packet. During traversal of the back-pointers, corresponding pointers pointing toward the destination are set up creating the route of forward pointers. Upon receiving the RREP packet, the source can then send data over the route which now has been constructed with forward and back pointers. All the intermediate nodes keep the route, defined locally as an intermediary's forward and back pointers corresponding to a specific endpoint route, as long as the route is active and has data periodically traversing it. If data does not traverse the links, a timeout occurs on a local level and the route is eliminated from the participating nodes on a local level. Additionally, in the event of a route break, the nodes that discover the break proceed to send a route error (RERR) message back to the source to inform the source of the break. In this case, the source must then reinitiate the route discovery protocol by broadcasting the RREQ packet again.

Destination-Sequenced Distance Vector (DSDV)

Destination-Sequenced Distance Vector routing protocol (hereafter referred to as "DSDV") is a routing algorithm designed for ad-hoc networks that is based on maintaining on each node, distance information about the appropriate next hop for each reachable destination in the network. DSDV was derived from the conventional Reservation Information Protocol (RIP) and as such, shares most of its functionality with RIP with the addition of a sequence number to distinguish stale routes. Functionality of this algorithm requires each distinctly identified node to periodically broadcast routing updates. Furthermore, this protocol attempts to maintain consistent, up-to-date routing information about the network.

DSDV operates by identifying all available destination nodes with unique even sequence numbers. Each DSDV node also maintains a routing table with an entry for routes to each possible destination. Each node then places a sequence number on each route in the routing table with information regarding the next hop to a certain destination, a cost metric for each hop, and a destination used to identify the correct hop in the node. The sequence numbers are used to uniquely identify routes in order to eliminate loops/cycles in the route. Furthermore, maintenance for this algorithm requires periodic transmitting of node routing tables in order to maintain table consistency on a global basis. These routing table synchronizations take the form of full table sharing, known as full dumps, and smaller synchronizations known as incremental dumps. In the case of full dumps, the packet carries all available routing information. However, the incremental dumps are used to relay differences, or changes, that have changed a local node's table.

Having a global up-to-date view of the network allows each node in the network to know which neighbor to forward data on to in order to move along the most direct route towards the destination.

At the heart of DSDV is the need to create and maintain globally consistent views of the network on each component node. This in turn incurs a level of network overhead that is unacceptable on wireless networks where the link medium is shared and constant broadcasting of table information can quickly saturate a wireless link.

With the increasing prevalence of topologically unstable networks, a new paradigm is needed to handle a constantly changing topology while still providing a similar level of connectivity and throughput that more traditional wired networks possess. Existing algorithms, most of which are deterministic, either impose too great of an overhead on topologically unstable networks in an attempt to maintain comparable levels of connectivity or do not have heavy levels of overhead at the cost of a much lower level of connectivity and throughput than can and should be attainable. In addition, because the topology is unstable, deterministic algorithms face significant challenges in dealing with incomplete, stale or erroneous topology information that simply arises because the network components are mobile. Lastly, most currently implemented algorithms rely on a quasi-centralized method of coordinating variable networks. Using a centralized design, even if designed in a hierarchical manner, creates certain points of failure that reduce the robustness of the overall network to reflect and scale to the number of coordinating nodes rather than the number of nodes comprising the network.

SUMMARY OF THE INVENTION

One embodiment of the invention requires every packet to maintain data about the number of hops (i.e., retransmissions that the packet has taken in its existence, the identity of the source of the packet, the identity of last node to forward the packet, the lowest signal quality encountered along the path of retransmissions and two Bloom filters (See "Space/time trade-offs in hash coding with allowable errors," Burton H. Bloom, *Communications of the ACM*, Vol. 13, pp 422-26, 1970), one which may be used to aid the routing of the packet (hereafter referred to as the "conduit filter") and one for keeping track of the nodes already traversed to aid in the routing of subsequent packets (hereafter referred to as the "history filter"). The history filter also serves to prevent cycles. Each time the packet is forwarded in the ad-hoc network, the forwarding node increments the number-of-hops field by 1, updates the last forwarding node to reflect itself, and hashes it's identifier into the packet's history filter. It should be noted that each of the Bloom filters used in the context of the present invention represents a set of contiguous nodes between two endpoints with no particular regard to order or sequence. This implies that even if the nodes move around and rearrange themselves, as long as the set is still contiguous, the filter remains a valid description of the network in between the two end points.

On a node level, each node keeps an index keyed by node identifiers corresponding to last known nodes. The node's index is updated from data contained in packets to allow the node to build a localized view of the network. The node is constantly eavesdropping for packets to build its localized view. From information contained in the packet, a node may be able to obtain the identity of the last node to forward the packet, the originator of the packet, the number of hops the current packet has traversed, the lowest signal quality encountered along the path that the packet has taken and, most importantly, a history filter that could be used to generate a conduit filter to aid in routing.

To initiate exchange of data a node may look in its index to find whether the packet's destination has had traffic originating from the destination pass through the node. If network traffic originating from the destination has been observed by the node recently, then there will be an entry in the index associated with the destination with a recent history of history filters. The history filters represent sets of nodes that were recently known to be contiguous between the node and the destination (i.e. they were once part of some valid route to the destination). Using these history filters, the node may generate a conduit filter as a hint to aid in the routing of the packet. A conduit filter may be the union of one or more history filters and thus be the union of many routes to the destination. If no entry is found, then the node provides no hint in the form of a conduit filter. Without regard to the existence of the conduit filter the packet is immediately transmitted. It will be appreciated that given a collection of nodes even with no knowledge of each others' existence, data exchange can immediately occur using the method of the present invention; network discovery is simply a part of the act of exchanging actual data.

For each packet that is received, the node may use a simple randomized algorithm to determine whether to forward the packet (i.e. retransmit the packet) or to drop the packet. The following pieces of data are used to determine the probability with which a node is forwarded in one embodiment:
1. The number of hops that a packet has already made (gleaned from the corresponding field in the packet's AHMR protocol header).
2. Whether the node itself is found in the packet's conduit filter signifying membership in a known past route to the destination.
3. Whether any of the nearby neighbors of the current (receiving) node are in the packet's conduit filter signifying membership in a known past route to the destination.
4. Whether the packet's destination is found in the node's index
   If the destination is found, then the number of hops the destination is currently away is taken into consideration.
5. The link quality at which the packet is received at the current node.
6. The number of nodes currently adjacent to the node.

As the number of hops already made increases, the probability calculating function reduces the probability that the packet of data may be forwarded. This is necessary to prevent the packet from propagating needlessly and loading the network unnecessarily. Thus, the number of hops is inversely proportional to the probability that a packet may be forwarded. In one preferred embodiment, the probability calculating function scales the probability using an inverse exponential function. In certain embodiments, a limit can also be imposed to completely preclude packet retransmission beyond a certain number of hops.

If the current node (i.e., the receiving node) is found to be in the set that is represented by the conduit filter, then the probability of retransmitting may be increased such that this factor is the dominant variable. The factor may be dominant because the originating node has explicitly hinted for a set of nodes to retransmit the packet. Furthermore, if a nearby node is found to be on a previously known path to the destination (i.e, if the identifier of a node known to nearby is found in the conduit filter), then retransmission is also preferably more likely to occur. However, the probability of retransmitting is significantly less than in the former case wherein the current node is found to be on a previously successful path to the destination.

If the destination for the packet is found in a node's index, the probability that the packet will be forwarded increases because the node is on some path that leads to the destination, though perhaps not the most optimal path. The probability increase is preferably scaled inversely to the number of hops away the destination node is (i.e., the more hops away, the less the increase) and proportionally to the lowest link quality along the known path to the destination (i.e., the higher the lowest link quality, the more the increase).

The probability may also be scaled in such a way as to maximize the physical distance traveled by the packet without over extending. In general, the lower the link quality at which the packet is received implies the farther the distance between the current node and the last forwarding node. Over extending in this case is defined as the link quality to the last forwarding node being so bad that it can be inferred that the likelihood of a packet from the current node reaching the last forwarding node is rather remote. Hence, in this case, the lower the link quality, the further upward the probability is adjusted, however at a certain point the probability will be adjusted downward. This behavior is expressed in one preferred embodiment in a number-generating function that is shaped like a normal distribution function and centered on some preset link quality value which, in one preferred embodiment, is a running average value of link quality.

DETAILED DESCRIPTION

Figure 1:
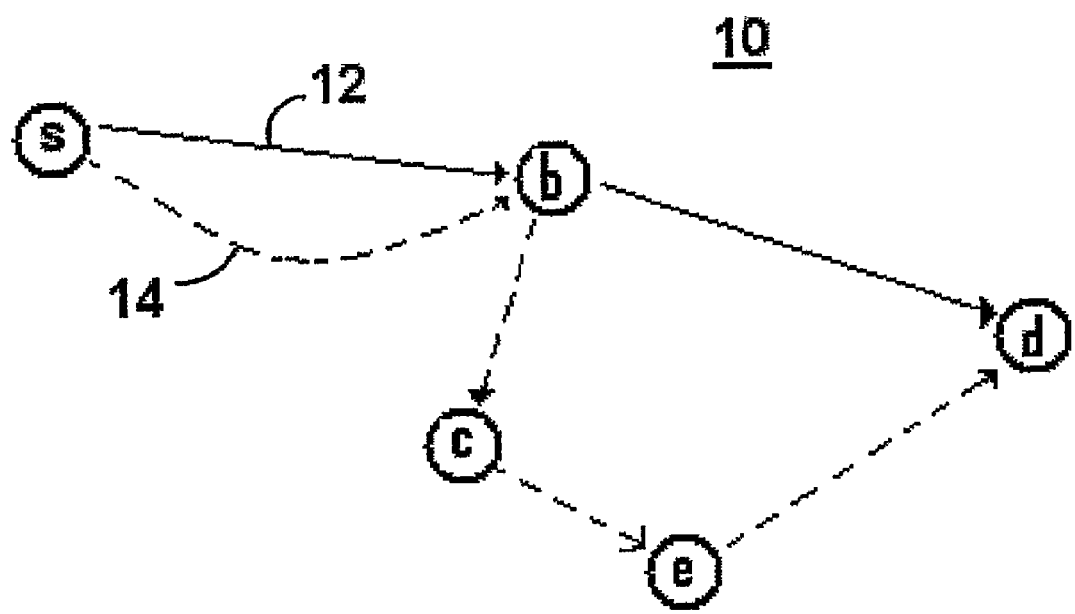
FIG. 1 shows two possible routes a packet might take in a hypothetical wireless mesh network comprised of five nodes.

Ad-Hoc Mesh Routing (hereafter referred to as "AHMR") refers to the algorithm used to construct scalable, robust networks topographically organized in a mesh (hereafter referred to as "mesh networks"). The method of the present invention concerns a method for constructing and maintaining stable networks from topologically variable networks in such a way that the network can operate without a coordinator or base station and each node can also serve as a router providing a high level of redundancy to improve overall network robustness. The method of the present invention algorithm can be used to construct ad-hoc networks such as wireless networks.

The method of the present invention aims to address both of these concerns by providing a level of connectivity on variable networks that is comparable to an equivalently sized topologically invariant network while imposing minimal overhead. As a result of focusing on minimal overhead, the performance of ad-hoc networks constructed with the method of the present invention can more closely approach the theoretical performance of a connected network. Additionally, the distributed nature of the AHMR algorithm eliminates any need for a centralized method of coordination, and as such, the reliability of the network scales to reflect the total number of nodes comprising the network. The design's core uses a unique randomized component that depends on a combination of localized node and packet state in order to create a distributed algorithm that provides for short range network connectivity in a network with highly variable topology. As such, the algorithm creates a short range mesh network that is robust to node and link failure. Additionally, because of the distributed nature of the algorithm, the network resulting from the method of the present invention will perform well in the face of localized adversarial attacks. As a mesh network, the network that arises through the use of the method of the present invention may self-heal around node and link failures, isolate and contain localized adversarial attacks, and scale positively in performance as the network node density increases. Finally, because of the minimal state, randomized design of the method of the present invention, the network that results has very little overhead allowing for positive scaling characteristics as the density of the network increases.

The present invention comprises a distributed, randomized algorithm used to provide topologically variable networks with the functionality of a substantially more stable network. The minimal amount of state necessary for the functioning of the method of the present invention reduces the link overhead which often overloads topologically variable networks. Furthermore, the relative independence of component nodes' state to functionality of overall network performance allows AHMR to scale horizontally over device type in the event that the component nodes have varying memory and processing requirements. Lastly, the distributed nature of the algorithm provides a certain level of inherent load-balancing. This inherent characteristic helps to mitigate and isolate localized congestion, both from normal and abnormal network operation. What follows is a detailed description and disclosure of the workings of the method of the present invention.

Packet Level Data

In a preferred embodiment of the present invention, packets maintain data about the number of hops that the packet has taken in its existence, the source of the packet, the last forwarding node, the lowest signal quality encountered through nodes already traversed and maintain two Bloom filters, one used to aid in the routing of the packet (hereafter referred to as the "conduit filter") and one for keeping track of the current path taken to aid in the routing of subsequent packets (hereafter referred to as the "history filter"). Each time the packet is forwarded in the ad-hoc network, the forwarding node increments the number-of-hops field by 1, updates the last forwarding node to reflect itself, and hashes its identifier into the packet's history filter.

Node Level Data

On a node level, each node keeps an index that caches information regarding the topology of the network. The information is stored in the form of histories of history filters encountered by the node. The history filters may be Bloom filters that represent sets of contiguous nodes between the node and some remote node that may form one or more routes between the two nodes. Other information associated includes the last value from the lowest signal quality encountered field in a packet received from a remote node and the number of hops away the remote node was last known to be located.

Node Index Update Algorithm

The node's index is updated from data contained in packets to allow the node to build a localized view of the network. From data in the packet, a node may be able to obtain the information about the last node that forwarded the packet. This information can be entered into the index along with a time stamp to allow for time decay of the data. The information regarding the originating node is also pulled out as well as the number of hops to this originating node and the lowest signal quality encountered by the packet. The information is also entered into the index. Furthermore, based on timers and the timestamps in the index, individual entries may be cleared to eliminate stale information.

General Operation

Given a collection of nodes using the method of the present invention with no prior communications and no knowledge of each others' existence, data exchange can immediately occur. Using the method of the present invention, there is no need for a node to run any network discovery queries nor is there a need to inform other nodes of its existence. Because of the shared nature of the link medium, whether wired or wireless, information about the local network topology can be gleaned either by sniffing all data packets or only data packets routed through itself. One can also see that conduit discovery is done implicitly by piggybacking in data packets off previously successful data transfers. Furthermore, use of a conduit is not a defined route, but rather a probabilistic optimization to increase reliability of data delivery and reduce unnecessary network traffic. As such, the non-deterministic nature of conduit data transfer is robust in the face of individual route elimination since a route break does not necessarily equate to a total cessation of communication and the end nodes almost immediately adapt the conduit to the new topology. Finally, link-level collisions of data can be handled by existing algorithms such as CSMA/CA and is beyond the scope of the AHMR algorithm.

Application of Index Update Algorithm

At initiation, a node may first clear its index. The node may then sniff for packets to determine if there are nodes possibly within range to which it can send data packets. A node may sniff the medium for all packets observed in a certain amount of time in order to get an idea of the network traffic and node density characteristics. For each packet sniffed, the tables may be updated to begin building a set based on the local network. Depending on a variety of factors including the variability of the network topology and node resources, randomly chosen packets may be sampled at differing frequencies to update the tables. This is mainly a strategy for reducing power consumption in devices that have limited battery power and reduce the use of the microprocessor of the device. However, there is a clear tradeoff between a high sampling frequency and knowledge of the network topology that should also be calibrated according to the capabilities of the device, though most devices would probably process every packet.

AHMR Routing

For each packet that is received, the node may use a simple randomized algorithm to determine whether to forward the packet (i.e. retransmit the packet) or to drop the packet. The following pieces of data may be used to determine the probability with which a packet is forwarded:

1. The number of hops that a packet has already made (gleaned from the corresponding field in the packet's AHMR protocol header).
2. Whether the node itself is found in the packet's conduit filter signifying membership in a known past route to the destination.
3. Whether any of the nearby neighbors of the current (receiving) node are in the packet's conduit filter signifying membership in a known past route to the destination.
4. Whether the packet's destination is found in the node's index
    If the destination is found, then the number of hops the destination is currently away is taken into consideration.
5. The link quality at which the packet is received at the current node.
6. The number of nodes currently adjacent to the node—i.e., one hop away.

As the number of hops already made increases, the probability calculating function reduces the probability that the packet of data may be forwarded. This is necessary to prevent the packet from propagating needlessly and loading the network unnecessarily. Thus, the number of hops is preferably inversely proportional to the probability that a packet may be forwarded. A limit can also be imposed to completely preclude packet retransmission beyond a certain number of hops.

If the current node (i.e., the receiving node) is found to be in the set that is represented by the conduit filter, then the probability of retransmitting may be increased such that this factor is the dominant variable. The factor is dominant because the originating node has explicitly hinted for a set of nodes to retransmit the packet. Furthermore, if a nearby node is found to be on a previously known path to the destination (i.e., if the identifier of a node known to be nearby is found in the conduit filter), then retransmission is also preferably more likely to occur. However, the probability of retransmitting is significantly less than in the former case wherein the current node is found to be on a previously successful path to the destination.

If the destination for the packet is found in a node's index, the probability that the packet will be forwarded increases because the node is on some path that leads to the destination, though perhaps not the most optimal path. The probability increase is scaled inversely to the number of hops away (i.e., the more hops away, the less the increase) and proportionally to the lowest link quality along the known path to the destination (i.e. higher the lowest link quality, the more the increase).

The probability is also scaled in such a way as to maximize the physical distance traveled by the packet without over extending. In general the lower the link quality at which the packet is received implies the farther the distance between the current node and the last forwarding node. Over extending in this case is defined as the link quality to the last forwarding node being so bad that it can be inferred that the likelihood of a packet from the current node reaching the last forwarding node is rather remote. Hence in this case the lower the link quality, the further upward the probability is adjusted, however at a certain point the probability will be adjusted downward. This behavior is expressed in the current implementation in a number generating function that is shaped like a normal distribution function and centered on some preset link quality value.

The probability of retransmission may also be scaled based on the number of nodes known to be within one hop of the receiving node. In one preferred embodiment, the probability is scaled inversely to the number of neighboring nodes inasmuch as in a high node density situation, it is more likely that a neighboring node has also received the packet and therefore system bandwidth may be conserved by decreasing the probability of (needless) retransmission.

Explanation of Data Gleaned from (1)

The number of hops field may be used to put an upper bound on the propagation of data in the network to avoid overloading the network. Intuitively, because of the inverse proportionality, data propagates radially from the data source and eventually decays into nothing over as it gets further away from the originator of the packet. If necessary, an absolute limit may also be imposed on the number of hops a packet could live. Thus, although data is propagating through space, there is a range limitation on the data's existence. A graphical representation of the propagation landscape is depicted in FIG. 2.

Explanation of Data Gleaned from (4)

In order to add additional intelligence to the network and extend the blind propagation as described previously, effectively an energy landscape is created through the network's collective use topology information on a per node level. The calculation of the probability using data gathered from (4) creates an energy landscape in which the nodes in the network collectively create data sinks. Because on a network level, data/destination sinks are created around every destination, data originating from a source anywhere can be directed toward the source if it enters a sink, corresponding to a node recognizing that the destination is nearby. Recognition that the destination node is near may cause an increase in the probability that the node will retransmit the data. Thus, when a packet enters the relevant data sink, propagation probability may be increased and the effect is initially amplified to create an aggregate directional movement toward the destination node.

Synthesis of Data Obtained in (1) and (4)

However, in order to avoid overloading the destination node as the data packet nears, there is preferably an inter-play between the probability calculated in (1) and (4). Therefore, as the probability is increasing because data finds itself increasingly closer to the destination via information gleaned from (2) at each hop, the number of hops is steadily increasing causing a damping and eventual decay effect on the probability increase. As such, the probability function determining retransmission may be scaled by the topological distance (measured by hops), distance to source (if known via the index), signal quality (SNR in wireless networks) and local node density. More specifically, the probability function may be negatively related to the topological distance and local node density. Signal quality is taken into account to maximize the actual physical distance covered without adversely affecting link reliability. Given this relationship, we see that that the probability of retransmitting is a greedy algorithm, assuming an obstruction-free physical medium, that attempts to retransmit at distances such that each hop is as far as possible, reducing unnecessary intermediate retransmits, except in the case where the destination is found within the local index and local transmits are completed.

Explanation of Data Gleaned from (2) and (3)

In order to construct positively reinforced virtual conduits, the data packets may hold a Bloom filter into which all nodes that were traversed from source to destination are hashed. This filter can then be used with packets on subsequent trips through the network in either direction as hints to help intermediate nodes identify whether they have been part of a previously-successful route to the destination. If so, then it is likely that the node is still a part of, or near a part of, a successful route to either end point. In this way, the method of the present invention may use this information as a dominant reinforcer of the probability of retransmitting. Furthermore, use of Bloom filters allows the simple aggregation of multiple routes with a simple bitwise OR operator. The significance of this is that the virtual conduit defined consists of multiple routes, of which the final route used could likely be routed through parts of different defined routes. The behavior of the packets to cross different defined conduits is a direct result of the probabilistic nature of the conduit reinforcement algorithm. This ability for a packet to create its own route through combinations of existing defined routes helps add a level of load balancing given the probabilistic nature of the algorithm. This is done so that the load on other parts of the network can be significantly lessened and to reduce the impact from solely using the uninformed method of (1) and (4).

Given that the use of probabilistic conduits is an optimization to increase link reliability and throughput over the basic radial propagation of data in an energy landscape, the worst case scenario is one in which the conduit method degenerates into the energy landscape model. This is desirable because of the lack of overhead incurred in a worst case scenario where network reliability is driven down significantly.

A simplified example of the use of AHMR in a hypothetical wireless mesh network comprised of five nodes is described below and depicted in FIG. 1 wherein is the source node, d is the destination node and b, c and e are intermediate nodes that may comprise one or more data pathways between the source and the destination. Two such data paths through network 10 are shown in FIG. 1. Path 12 (shown as a solid line) is a route taken by a packet from node s (the source) to node d (the destination) through intermediate node b. In the example illustrated, node d is not within the radio range of node s. This may be due simply to distance or could be due to interfering structures or terrain which prevents a radio signal emanating from node from reaching node d with sufficient signal quality. However, intermediate node b is within radio range of both node s and node d. Accordingly, when node s transmits a data packet, that data packet is received by intermediate node b. The header of the packet may comprise the following information: a unique identifier associated with the source node s, a field containing the number of hops the packet has taken (in this case zero) and a unique identifier associated with the intended destination node d.

Node b may first examine the destination identifier to determine whether it (node b) is the intended destination. In the illustrated case, it is not (node d is the intended destination). Node b may now examine the data field that contains the identifier of the last forwarding node—in this case, node s—and update its index to reflect the fact that node s is one hop away and associates with node s the history filter representing the set of nodes {s}. The update of the index and association of the history filter with a node is hereafter referred to as the "caching of topology information." Node b must now decide whether to forward—i.e., retransmit—the data packet. It may do this by adjusting the probability that it will retransmit based on one or more factors and then generating a random number using the uniform distribution to compare to the probability value. In the illustrated embodiment, if the random number does not exceed the probability, then the packet is retransmitted. This may be thought of as rolling a pair of dice to stay under some threshold constantly being redetermined—this adds an element of randomness to the outcome whose success is non-deterministically affected by a probability. The probability may be adjusted by the number of hops the packet has taken. In this case, the packet has taken only one hop (from node s to node b). Thus, the probability of retransmission may be adjusted upward (since the packet has not traveled far). Node b may also determine whether the destination (node d) is one of its nearby neighbors. In this case, the destination is only one hop away. If a previous packet were received by node b from node d, node b would "know" that the destination node of the packet was only one hop away and could therefore increase the probability that it would retransmit the packet. Node b may also examine the data in the packet's header to determine whether it (node b) is hinted by the source node s to be a member of some set of nodes contiguous between node s and the destination (node d) (i.e., node b is a member of the set of nodes represented by the conduit filter). If so, the probability of retransmission may be increased much further. It will be appreciated that in a mobile, ad hoc mesh network, nodes can move around and thus what once was a successful route between two nodes may no longer be a successful connection path. In a static, fixed network, a past successful route may no longer be a successful connection path due to environmental factors.

After node b has made the appropriate probability adjustments, it may "roll the dice" to determine whether to retransmit (forward) the packet. In the illustrated example, the outcome is positive and node b changes the information in the packet's header to reflect that the packet has taken one hop from the source node s, that node b was the last forwarding node and node b is one of the nodes that the packet has thus far been through on its journey, which is represented as a history filter representing the set of nodes {s, b}. Node b may then retransmit (broadcast) the packet with the updated information in the packet header.

As shown in FIG. 1 by the solid line, node d is within radio range of intermediate node b, and when node b retransmits the packet it may be received by node d. Node d may find that it is the intended destination of the packet and will therefore not retransmit the packet. Instead, because data traffic is typically bidirectional, it may send a reply packet to the node s, using a conduit filter formed from the history filters stored in its index to aid in the routing. Node d may also cache the topology information to reflect the fact that node b is one hop away and node s is two hops away. The history filters representing the set of nodes {b} and set of nodes {s, b} will be associated with node b and node s respectively.

In the wireless mesh network depicted in FIG. 1, node c is also within radio range of node b. Thus, when node b retransmits the packet, the packet is also received by intermediate node c. This path is depicted by dashed line 14 in FIG. 1. Node c may go through the same analysis and caching of topology information as that described for node b. However, in this case, certain values will be different: the number of hops the packet has taken is now two—s to b and b to c; node d is two hops away; and, node c does not find that it was hinted by node s to be on a path from node to node d by a conduit filter. Accordingly, its probability of retransmitting is adjusted to a much lower value. However, in the illustrated case, the "roll of the dice" nevertheless produces a positive result and node c forwards the packet after setting the number of hops to two, placing its identifier in the "last forwarding node" field and adding its identifier to the set of nodes the packet has thus far been through, which is represented by the history filter representing the set of nodes {s, b, c}.

Node e is within receiving range of node c. Upon receiving the packet from node c, node e may go through the same analysis caching of topology information as that described for node b. However, in this case, the number of hops the packet has taken is now three—s to b, b to c and c to e; node d is one hop away; and, node e does not find that it was on a known route from node s to node d. Accordingly, its probability of retransmitting is adjusted to a lower value. In this case since node e is only one hop away from node d, the effect on the probability having traversed one additional hop may be canceled out by the fact that node e may know that is it only one hop away from node d. However, in the illustrated case, the "roll of the dice" nevertheless produces a positive result and node e forwards the packet after setting the number of hops to three, placing its identifier in the "last forwarding node" field and adding its identifier to the list of nodes the packet has thus far been through, which is represented as the history filter representing the set of nodes {s, b, c, e}.

Upon receiving the packet from node e, node d should find that this particular packet was already received from node b and thus may be ignored. However, node d may cache the topology information it has learned about node e. Node d may also note that the set of nodes {s, b, c, e} are members of a path to node s. If, at a later time, the path s to b to d were broken, the history filter of the packet received from node e could be used as the conduit filter of subsequent packets. If neither path is reliable enough, node d may choose to use both routes by making the conduit filter the union of the two history filters (i.e., a bitwise OR of the two history filters) to in order to gain redundancy in the packet transmission.

It will be appreciated that node s may also be within receiving range of node b. Thus, when node b retransmits the packet, the packet may also be received by node s. By examining the contents of the packet header, node s can find that it was the source of the packet and thus the packet has merely "bounced back" from intermediate node b and it (node s) need not retransmit the packet. Node s may, however, update its index to reflect the fact that node b is (or remains) one hop away.

Now that node d has received two copies of the same packet through two different paths, it chooses to reply to node s. It will be appreciated that in TCP/IP, the most common protocol in the Internet that can be layered on top of AHMR, the initial packet sent from node s will be a "SYN" and the subsequent reply from node d will be a "SYN, ACK" to acknowledge the successful connection between the two nodes. Since node d has already received traffic from node s, it will have knowledge of history filters that can be used to create conduit filters as a hint to the network. In the illustrated case it is most optimal to use a conduit filter that comprises of the history filter representing the set of nodes {s, b} and node d does just that. It will be appreciated that in certain circumstances node d may decide to use the history filter representing nodes {s, b, c, e}.

Upon receiving the reply packet from node d, node b may go through the same analysis and caching of topology information as that previously described. However, in the illustrated case, node b sees that it is a member of the set represented by the conduit filter and therefore greatly increases the probability that it will retransmit the packet. In the illustrated case the "roll of the dice" produces a positive result and the packet is retransmitted.

Because node e is also in range of node d, node e receives the exact same packet as node b and node e may go through the same analysis and caching of topology information as that previously described. However, in the illustrated case node e sees that it is not a member of the set represented by the conduit filter and greatly decreases the probability that it will retransmit the packet. In the illustrated case the "roll of the dice" produces a negative result and the packet is simply dropped.

Upon completion of the packet's transmission from node s to node d via routes 12 and 14 and the reply sent from node d to node s, the following information may be retained by the various nodes:

node b may have the identifiers of node s, node c and node d in its index of nodes and associate the history filters representing the set of nodes {s}, set of nodes {c} and set of nodes {d} with node s, node c, node d respectively.

node c may have the identifiers of node s and node b in its index of nodes and associate the history filters representing the set of nodes {s, b} and set of nodes {b} with node s and node b respectively.

node e may have the identifiers of node s and node c in its index of nodes and associate the history filters representing the set of nodes {s, b, c} and set of nodes {c} with node s and node c respectively.

node d may have the identifiers of node s, nodes b and node e in its index and associate the history filters representing the set of nodes {b} and set of nodes {e} with node b and node e respectively. It may also associate either or both the set of nodes {s, b} and set of nodes {s, b, c, e} with node s.

node s may have the identifiers of node b and node d in its index and associate the history filters representing the set of nodes {b} and the set of nodes {b, d} with node b and node d respectively.

Referring now to FIG. 2, one particular embodiment of the invention is shown in flowchart form. A data packet is received by a particular node at 500. The header of the packet contains the identifier of the last forwarding node. At decision diamond 502, it is determined whether the last forwarding node is known to be within one hop (transmission) away. This may be done by testing the history filter (a Bloom filter) maintained by the current (receiving) node with the identifier of the last forwarding node. If the last forwarding node is found to be a member of the set of nodes known to be one hop away, the expiration time for that filter may be reset at block 506 since it has been confirmed that the last forwarding node is still within a range of one hop. If the last forwarding node is not found in the set of nodes one hop away, it may be cached in the index with a time stamp and a hop count of 1 at block 504. In a preferred embodiment, its identifier may be hashed into a counting filter (a variation of the Bloom filter that supports element removal) containing the identifiers of nodes known to be within one hop away from the receiving node.

At decision diamond 508, the source of the packet is tested for its presence in the receiving node's index. The header of the packet may contain both the identifier of the source and the number of hops N (retransmissions) the packet has taken. It will be appreciated that the source node is therefore N+1 hops away and the history filter of the packet may be used as a conduit filter for future packets sent by the receiving node to the source node. Accordingly, if the source node is found to be cached, its expiration time may be refreshed at block 512; if not, its history filter may be cached in the index at block 510 for possible future use as a conduit filter.

When a node is initialized, it may "sniff" packets received by repeating steps 500 through 512, inclusive, to gain a localized view of the network. Stated another way, upon joining a mesh network, a node may be programmed to sniff packets for a predetermined interval or until a pre-selected number of packets have been examined before the node forwards (i.e., retransmits) any packets. This strategy may increase the probability that a retransmission is efficacious.

At decision diamond 514, the packet's destination is tested to determine whether the current node (the receiving node) is, in fact, the destination. If so, the packet's contents are placed in a stack (at block 516) for subsequent re-assembly and the process terminates at 518.

If the current node is not the packet's destination, the conduit filter contained in the packet's header is tested (at diamond 520) to determine whether the current packet is a member of a set of nodes known to comprise a previously-successful route from the source to the destination. If so, as shown at block 522, the history filter contained in the packet header is updated to reflect the current node (i.e., the identifier of the current node is hashed into the Bloom history filter), the field representing the signal quality (which may be a value related to signal-to-noise ratio) is updated if the signal quality observed during the receipt of the packet is lower than what is indicated on the packet, the number-of-hops field is incremented by 1 and the packet is then forwarded (retransmitted) at block 524 and the process concludes (at terminator 526). In yet other embodiments, probabilities may be taken into account to decide whether the packet should or should not be retransmitted.

If the current node is not found in the packet's conduit set, the process continues at decision diamond 530 (see FIG. 2B) where the packet's header is examined to determine whether there is a neighbor that is a member the conduit filter.

If a neighbor is a member of the conduit filter, a probability of forwarding the packet is calculated at block 532; if not, a probability is calculated and significantly scaled downward at block 534 by a pre-selected constant value.

At block 536, a random number is generated via a uniform distribution function by the receiving node and, at diamond 538, the calculated (and scaled) probability is compared to the random number. If the random number does not exceed the probability, the packet is forwarded (retransmitted) at block 540 after updating signal quality if the observed signal quality during the receipt of the packet is lower than indicated on the packet, history filter and number of hops. If the random number generated is greater than or equal to the calculated probability, the packet is dropped (as shown at block 544) and the process concludes at terminator 546.

Figure 2A:
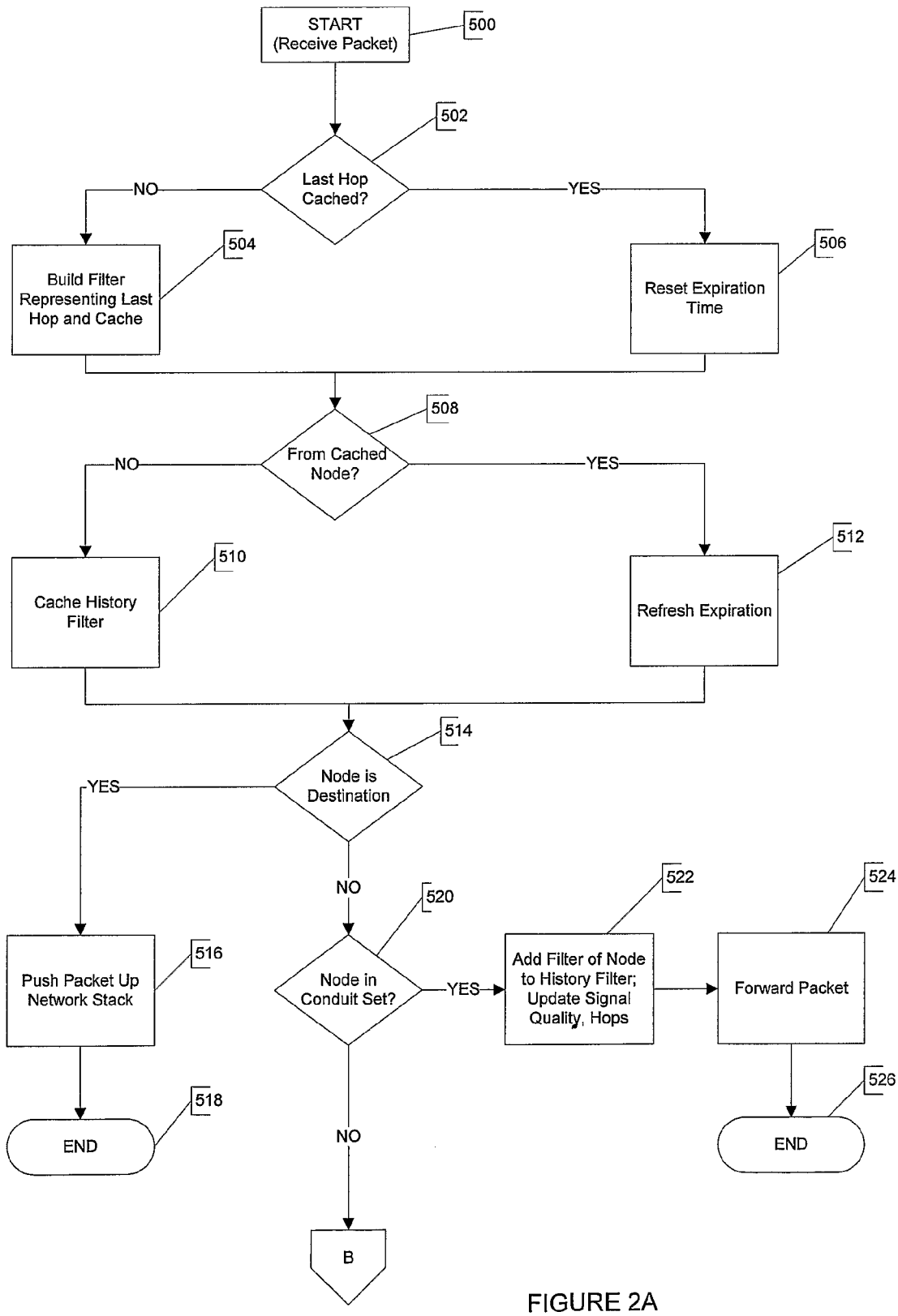
FIG. 2A and FIG. 2B together are a flowchart of one embodiment of the invention.
Figure 2B:
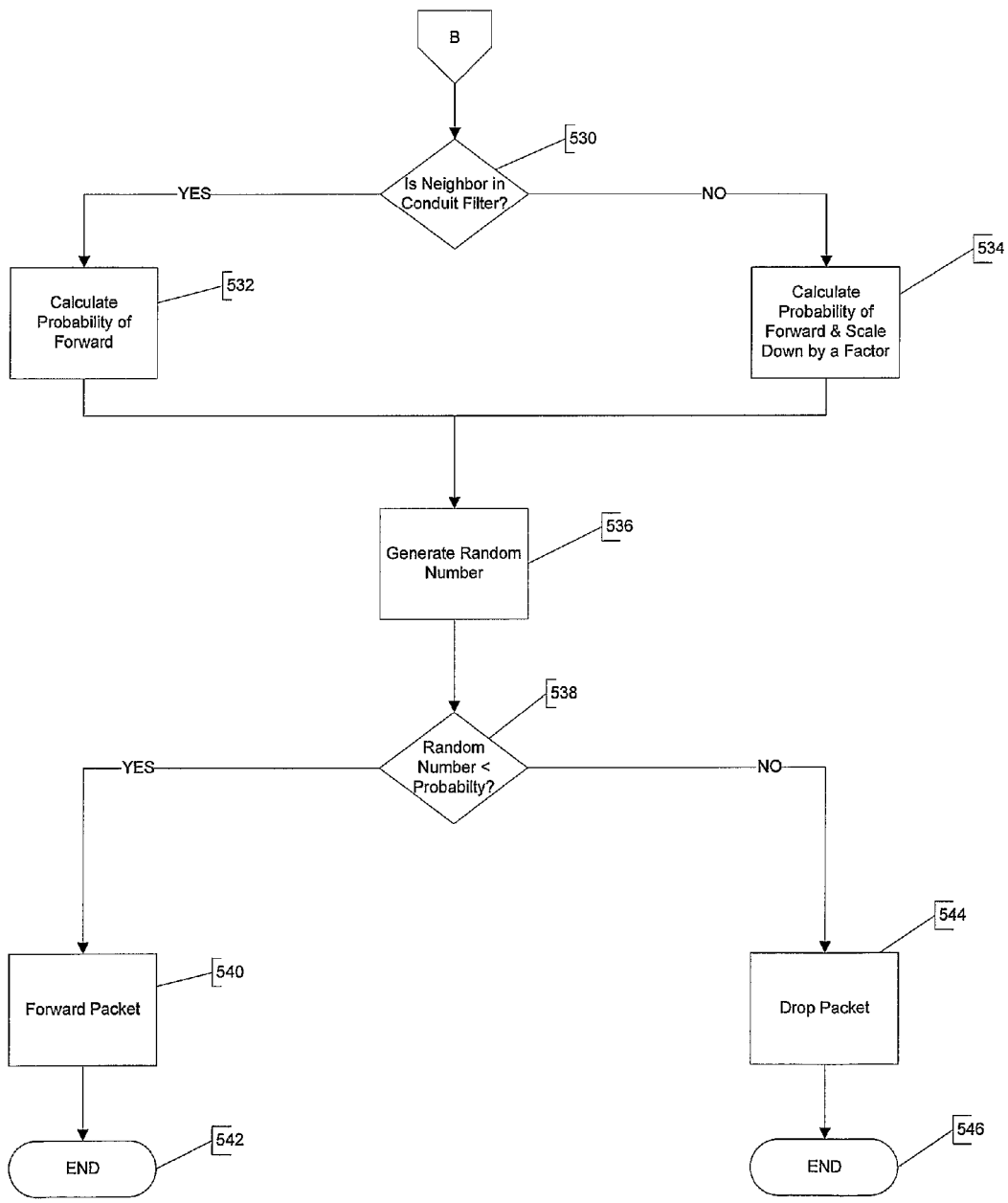
Figure 3:
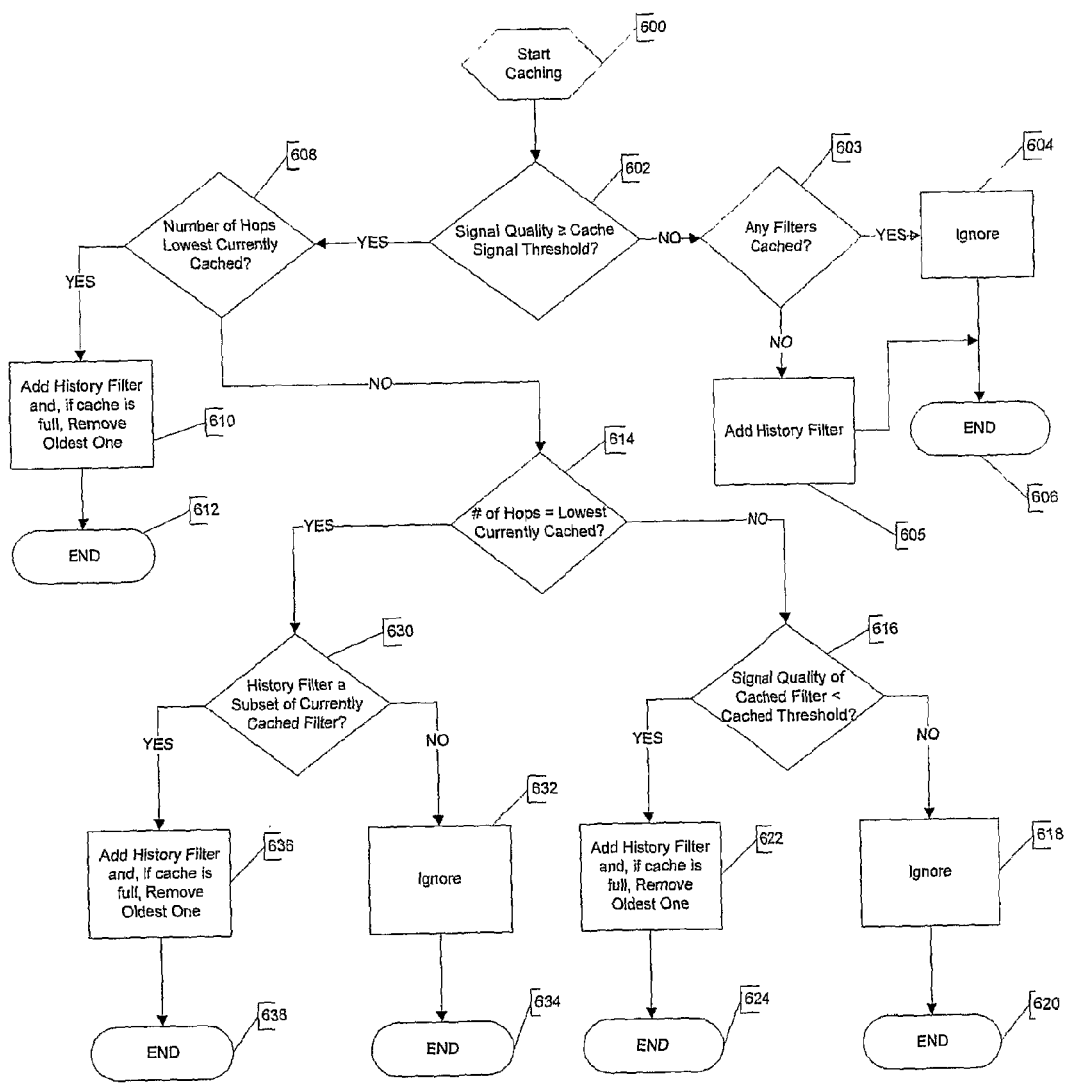
FIG. 3 is a flowchart of one method for history filter caching to create conduit filters according to the present invention.

The process identified at block 510 in FIG. 2A for history filter caching is shown in more detail in the flowchart of FIG. 3. The history filter of a received packet contains the identifiers of nodes that comprise a route from the source node to the receiving node. Thus, if the receiving node has a need in the future for sending a packet to the source node, it may send that packet with a conduit filter—i.e., the packet may be sent with routing information instead of relying solely on being forwarded successfully by chance.

The caching process begins at 600. In a wireless network using radio transceivers, the packet may be received with a signal quality that may be quantified. For example, the packet may have been received with a signal having a certain signal-to-noise ratio. The caching process may discriminate against signals having a signal quality less than a pre-selected value (threshold). This may be tested at diamond 602 and if the quality of the received signal is less than the threshold value then the history filter is only added to the cache (block 605) if the cache is empty (diamond 603), otherwise it is ignored (block 604) and the process ends at 606. In this way, the probability that a cached history filter contains an error is reduced.

If the signal quality meets or exceeds the threshold value set, the field of the packet's header containing the number of hops (transmissions) the packet has taken thus far in its journey is tested (at diamond 608) to determine whether the particular route represented by the history filter of the received packet is the shortest (fewest number of hops) of the routes to the source node currently "known" by the receiving node. If it is, the history filter (which may be a Bloom filter) is cached and the oldest history filter (i.e., the history filter having the earliest time stamp) is removed from the cache of history filters representing a known, successful route to the source node (block 610). In this way, the freshness (currency) of the history filter cache is maintained in a network where nodes may move around or paths between nodes may become blocked.

If the number of hops of the current history filter is equal to the lowest number of hops of the history filters already in the cache (diamond 614), the history filter is tested (at diamond 630) to determine whether it is a subset of a cached filter. A history filter is a subset of the cached filter if the intersection of the two filters is equal to the history filter. When using a Bloom filter, this may be tested for by simply taking the bitwise AND of the history filter and the cached filter. If the end result of the bitwise AND equals the history filter, then the history filter is a subset of the cached filter. If it is a subset of a cached filter, it is added to the cache of history filters and the oldest filter in the cache is removed (block 636). The process then concludes at 638. If, however, the history filter of the current packet is not found to be a subset of a currently-cached filter it is ignored (block 632)—i.e., it is not added to the cache—and the process concludes at 634.

If the number of hops of the current history filter is not equal to the lowest number of hops of the history filters already in the cache (diamond 614), the signal quality of the cached history filters is tested (at diamond 616) to determine whether the signal quality of any previously-cached filter is less than the pre-selected cache threshold (as may have been added at block 605). If so, the history filter of the current packet is added to the cache and the oldest one removed (block 622); if not, the history filter is ignored (block 618) and the process terminates at 620.

The majority of existing algorithms for creating reliable mesh overlays on unstable networks are derived from modifications to functional algorithms currently in use on relatively more stable networks such as the various Internet protocols. As such, these algorithms impose a level of network overhead that, although acceptable for relatively stable networks such as wired networks, is not acceptable for topologically variable networks such as wireless networks. Additionally, in the specific case of wireless networks, there is a significant reduction in bandwidth capacity when compared to existing wired networks. These two factors, on the algorithm side as well as the link medium side, combine to impose a level of overhead that dominates the overall amount of communication as existing algorithms work consistently to create a stabilized network view of an inherently unstable network.

AHMR's fundamental approach to creating a mesh overlay on topologically variable networks is that there is no need to perform the operations that attempt to impose an invariant view of the network. Furthermore, the method of the present invention does not have to incur the related network overhead associated with imposing a structure which need not be imposed.

The method of the present invention may be implemented in a processor-based system having a medium storing instructions for causing the processor to execute the steps of the method.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method for routing data packets non-deterministically in a wireless mesh network comprising:
   calculating in a node of the wireless network a probability of forwarding a received packet via re-transmission;
   generating in the node a threshold value that is a function of a random number;
   comparing the calculated probability to the generated threshold value; and,
   re-transmitting the packet if the calculated probability is greater than the generated threshold value.

2. A method as recited in claim 1 wherein the probability of re-transmitting a received packet is a function of the number of times the packet has been transmitted.

3. A method as recited in claim 1 wherein the probability of re-transmitting a received packet is a function of whether the receiving node is a member of a set of nodes comprising a previously-successful route to the destination.

4. A method as recited in claim 1 wherein the probability of re-transmitting a received packet is a function of whether the destination is a member of a set of nodes pre-determined to be within a known number of transmissions.

5. A method as recited in claim 4 wherein the probability of re-transmitting a received packet is additionally a function of the known number of transmissions.

6. A method as recited in claim 1 wherein the probability of re-transmitting a received packet is a function of whether a member of a set of nodes pre-determined to be within a known number of transmissions is a member of a set of nodes that comprised a previously-successful route to the destination.

7. A method as recited in claim 6 wherein the probability of re-transmitting a received packet is additionally a function of the known number of transmissions.

8. A method as recited in claim 1 wherein the probability of re-transmitting a received packet is a function of the number of times the packet has been transmitted and whether the receiving node is a member of a set of nodes comprising a previously-successful route to the destination.

9. A method as recited in claim 1 wherein the probability of re-transmitting a received packet is a function of the number of times the packet has been transmitted and whether the destination is a member of a set of nodes pre-determined to be within a known number of transmissions.

10. A method as recited in claim 9 wherein the probability of re-transmitting a received packet is additionally a function of the known number of transmissions.

11. A method as recited in claim 1 wherein the probability of re-transmitting a received packet is a function of the number of times the packet has been transmitted and whether a member of a set of nodes pre-determined to be within a known number of transmissions is a member of a set of nodes that comprised a previously-successful route to the destination.

12. A method as recited in claim 11 wherein the probability of re-transmitting a received packet is additionally a function of the known number of transmissions.

13. A method as recited in claim 1 wherein the probability of re-transmitting a received packet is a function of whether the receiving node is a member of a set of nodes comprising a previously-successful route to the destination and whether the destination is a member of a set of nodes pre-determined to be within a known number of transmissions.

14. A method as recited in claim 1 wherein the probability of re-transmitting a received packet is a function of whether the receiving node is a member of a set of nodes comprising a previously-successful route to the destination and whether a member of a set of nodes pre-determined to be within a known number of transmissions is a member of a set of nodes that comprised a previously-successful route to the destination.

15. A method as recited in claim 14 wherein the probability of re-transmitting a received packet is additionally a function of the known number of transmissions.

16. A method as recited in claim 1 wherein the probability of re-transmitting a received packet is a function of whether the destination is a member of a set of nodes pre-determined to be within a first known number of transmissions and whether a member of a set of nodes pre-determined to be within a second known number of transmissions is a member of a set of nodes that comprised a previously-successful route to the destination.

17. A method as recited in claim 16 wherein the probability of re-transmitting a received packet is additionally a function of the first known number of transmissions and the second known number of transmissions.

18. A method as recited in claim 1 wherein the probability of re-transmitting a received packet is a function of the number of times the packet has been transmitted, whether the receiving node is a member of a set of nodes comprising a previously-successful route to the destination and whether the destination is a member of a set of nodes pre-determined to be within a known number of transmissions.

19. A method as recited in claim 18 wherein the probability of re-transmitting a received packet is additionally a function of the known number of transmissions.

20. A method as recited in claim 1 wherein the probability of re-transmitting a received packet is a function of the number of times the packet has been transmitted, whether the receiving node is a member of a set of nodes comprising a previously-successful route to the destination and whether a member of a set of nodes pre-determined to be within a known number of transmissions is a member of a set of nodes that comprised a previously-successful route to the destination.

21. A method as recited in claim 20 wherein the probability of re-transmitting a received packet is additionally a function of the known number of transmissions.

22. A method as recited in claim 1 wherein the probability of re-transmitting a received packet is a function of the number of times the packet has been transmitted, whether the destination is a member of a set of nodes pre-determined to be within a first known number of transmissions and whether a member of a set of nodes pre-determined to be within a second known number of transmissions is a member of a set of nodes that comprised a previously-successful route to the destination.

23. A method as recited in claim 22 wherein the probability of re-transmitting a received packet is additionally a function of the first known number of transmissions and the second known number of transmissions.

24. A method as recited in claim 1 wherein the probability of re-transmitting a received packet is a function of whether the receiving node is a member of a set of nodes comprising a previously-successful route to the destination, whether the destination is a member of a set of nodes pre-determined to be within a first known number of transmissions and whether a member of a set of nodes pre-determined to be within a second known number of transmissions is a member of a set of nodes that comprised a previously-successful route to the destination.

25. A method as recited in claim 24 wherein the probability of re-transmitting a received packet is additionally a function of the first known number of transmissions and the second known number of transmissions.

26. A method as recited in claim 1 wherein the probability of re-transmitting a received packet is a function of the number of times the packet has been transmitted, whether the receiving node is a member of a set of nodes comprising a previously-successful route to the destination, whether the destination is a member of a set of nodes pre-determined to be within a first known number of transmissions and whether a member of a set of nodes pre-determined to be within a second known number of transmissions is a member of a set of nodes that comprised a previously-successful route to the destination.

27. A method as recited in claim 26 wherein the probability of re-transmitting a received packet is additionally a function of the first known number of transmissions and the second known number of transmissions.

28. A method as recited in any of claims 1 through 27 further comprising: inserting the identifier of the receiving node into the header of each packet to be retransmitted; incrementing the number of transmissions contained in the header of each packet to be retransmitted; updating a table containing the identifiers of nodes that are one transmission away to contain the identifier of the last forwarding node; and, updating a table containing the identifiers of nodes known to be the number of transmissions away that is equal to the number of times the packet has been transmitted to contain the identifier of the source node.

29. A method for routing data packets in a wireless mesh network comprising: calculating in a node of the wireless network a probability of re-transmitting a received packet based on at least one factor selected from the group consisting of the signal quality of the packet, the number of times the packet has been transmitted, whether the destination is a member of a set of nodes pre-determined to be within a known number of transmissions, whether a node known to be within a predetermined number of transmissions is a member of a set of nodes that comprised a previously-successful route to the destination, whether the receiving node is member of a set of nodes that comprised a previously-successful route to the destination, and the number of nodes previously determined to be within receiving range of the receiving node;
generating in the node a threshold value that is a function of a random number; comparing the threshold value to the calculated probability; re-transmitting the packet if the calculated probability is greater than the threshold value; and dropping the packet if the calculated probability is less than the threshold value.

30. A processor based system for routing data packets in a wireless mesh network comprising a medium storing instructions for causing the processor to: calculate a probability of re-transmitting a received packet based on at least one factor selected from the group consisting of the number of times the packet has been transmitted, whether the destination is a member of a set of nodes pre-determined to be within a known number of transmissions, whether a node known to be within a predetermined number of transmissions is a member of a set of nodes that comprised a previously-successful route to the destination, whether the receiving node is member of a set of nodes that comprised a previously-successful route to the destination, and the number of nodes previously determined to be within receiving range of the receiving node;
generate a randomized threshold value; compare the randomized threshold value to the calculated probability; and, re-transmit the packet if the calculated probability is greater than the randomized threshold value.

31. A system as recited in claim 30 further comprising instructions for causing the processor to insert the identifier of the receiving node into the header of each packet to be retransmitted, to increment the number of transmissions contained in the header of each packet to be retransmitted, to update a table containing the identifiers of nodes that are one transmission away to contain the identifier of the last forwarding node and to update a table containing the identifiers of nodes known to be the number of transmissions away that is equal to the number of times the packet has been transmitted to contain the identifier of the source node.

32. A system as recited in claim 31 further comprising instructions to clear the tables containing the identifiers of nodes known to be a certain number of transmissions away after a pre-selected interval has elapsed.

33. A system as recited in claim 31 further comprising instructions to clear an entry in the tables containing the identifiers of nodes known to be a certain number of transmissions away after a pre-selected interval has elapsed since the entry was inserted in the table.

34. A method as recited in claim 29 further comprising using a Bloom filter to determine whether the destination is a member of a set of nodes pre-determined to be within a known number of transmissions, whether a node known to be within a predetermined number of transmissions is a member of a set of nodes that comprised a previously-successful route to the destination, and whether the receiving node is member of a set of nodes that comprised a previously-successful route to the destination.

* * * * *